METAL FREE PHTHALOCYANINE IN THE NEW X-FORM

Original Filed Oct. 29, 1965 2 Sheets-Sheet 1

INVENTORS
JOHN F. BYRNE
PHILIP F. KURZ
BY Richard A. Tonkin
James J. Palaiste
ATTORNEYS

METAL FREE PHTHALOCYANINE IN THE NEW X-FORM

Original Filed Oct. 29, 1965 2 Sheets-Sheet 2

INVENTORS
JOHN F. BYRNE
PHILIP F. KURZ
BY Richard D. Tomlin
James J. Roberts
ATTORNEYS United States Patent Office Re. 27,117
Reissued Apr. 20, 1971

27,117
METAL FREE PHTHALOCYANINE IN THE NEW X-FORM

John F. Byrne, Worthington, and Philip F. Kurz, Columbus, Ohio, assignors to Xerox Corporation, Rochester, N.Y.

Original No. 3,357,989, dated Dec. 12, 1967, Ser. No. 505,723, Oct. 29, 1965, which is a continuation-in-part of Ser. No. 375,191, June 15, 1964. Application for reissue June 10, 1968, Ser. No. 741,815
Int. Cl. C09b *47/08*
U.S. Cl. 260—314.5 2 Claims

Matter enclosed in heavy brackets [ ] appears in the original patent but forms no part of this reissue specification; matter printed in italics indicates the additions made by reissue.

ABSTRACT OF THE DISCLOSURE

A new polymorphic form of metal-free phthalocyanine is disclosed. This polymorph, referred to as the "X-form," is identified by X-ray and infrared spectra. Several methods of preparing the X-form of metal-free phthalocyanine are disclosed.

This invention relates to phthalocyanine in general and, more specifically, to a new polymorphic form of metal-free phthalocyanine. This application is a continuation-in-part of copending application Ser. No. 375,191, filed June 15, 1964, *now abandoned.*

Phthalocyanine, which also is known as tetrabenzotetraazaporphin and tetrabenzoporphyrazine, may be said to be the condensation product of four isoindole groups. Metal-free phthalocyanine has the following general structure.

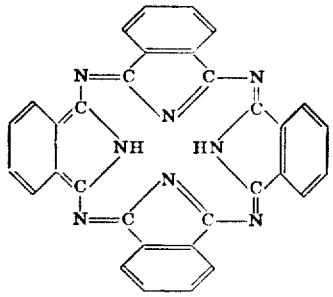

In addition to the metal-free phthalocyanine of the above structure, various metal derivatives of phthalocyanine are known in which the two hydrogen atoms in the center of the molecule are replaced by metals from any group of the periodic table. Also, it is well known that from one to sixteen of the peripheral hydrogen atoms in the four benzene rings of the phthalocyanine molecule may be replaced by halogen atoms and by numerous organic and inorganic groups. The following discussion is directed primarily to substituted and unsubstituted metal-free phthalocyanine.

Phthalocyanine is known to exist in at least three polymorphic forms which may be easily distinguished by comparison of their X-ray diffraction patterns and/or infrared spectra. Also, the color of the pigment varies according to the polymorphic form, the beta form being greener than the alpha or gamma forms. As discussed in more detail below, there is some question whether the reported gamma form is actually a separate polymorph, or is instead merely a less crystalline form of alpha phthalocyanine. In addition to these three well-known forms, which exist in both metal containing and metal-free phthalocyanine, additional polymorphs of metal-containing phthalocyanine are known, i.e., "R"-form disclosed in U.S. Pat. 3,051,721, "delta" form described in U.S. Pat. 3,160,635, and another "delta" form described in U.S. Pat. 3,150,150.

It has now been found that metal-free phthalocyanine exists in an additional form, hereinafter referred to as "X-form" phthalocyanine. As pointed out more fully below, the X-ray diffraction spectra and infrared spectra of this form differ significantly from those of the prior known forms. As described and claimed in the above-cited parent application, X-form phthalocyanine has utility as a photoconductive material in electrophotography when mixed with a binder and coated onto a substrate. The resulting electrophotographic plate has surprisingly high photo-sensitivity when the phthalocyanine is either entirely X-form or a mixture of X-form and alpha-form phthalocyanine.

The distinctions between the new X-form metal-free phthalocyanine and the prior known alpha, beta and gamma forms will become more apparent upon reference to the drawings, which consist of compartive X-ray diffraction spectrums and infrared spectra for the different polymorphic forms of metal-free phthalocyanine. In the drawing.

Figure 1:
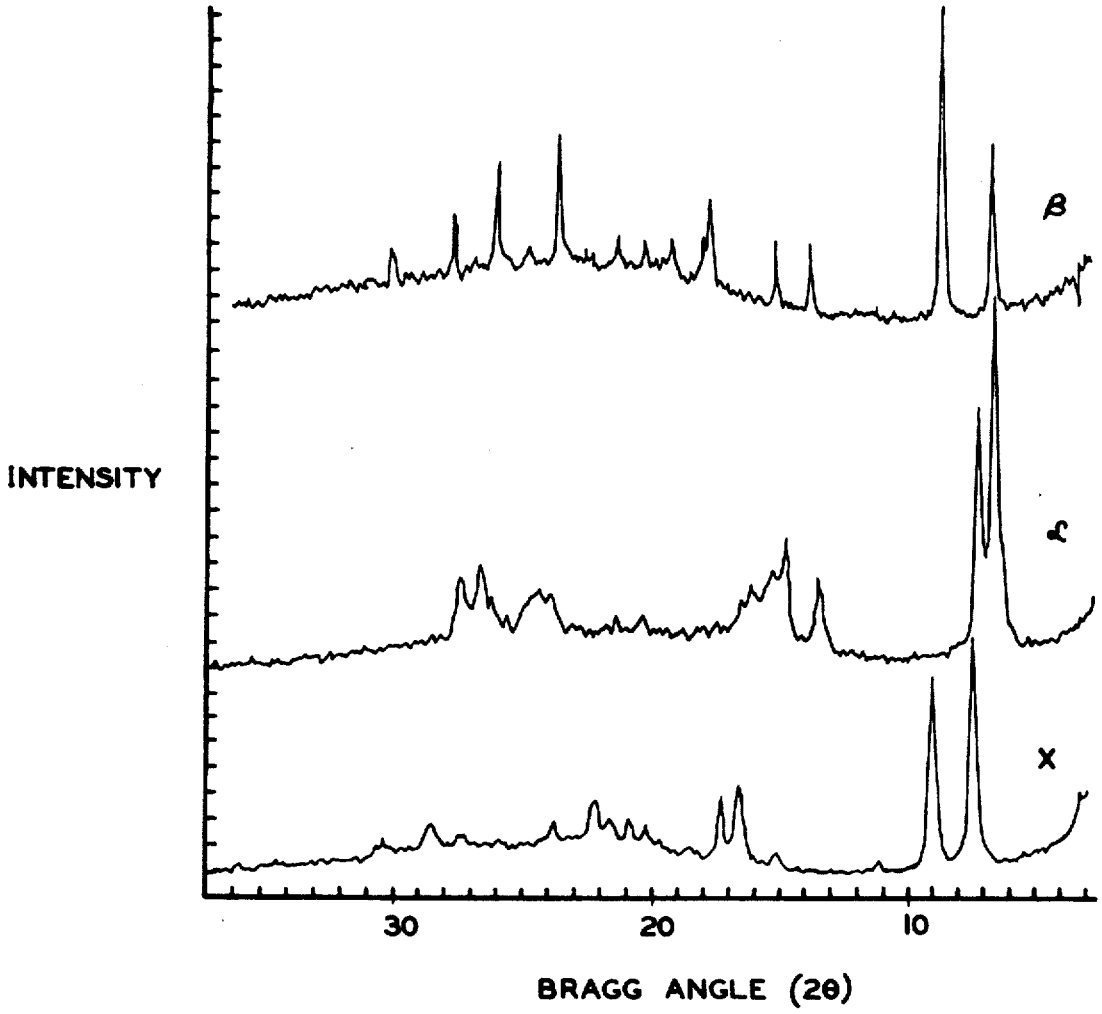
FIG. 1 shows X-ray patterns for alpha, beta and X-form polymorph for samples prepared in the laboratory.

FIG. 1 shows a set of curves comparing alpha, beta and X-forms of metal-free phthalocyanine arranged in vertical alignment for easy comparison. The samples of each form of phthalocyanine tested by X-ray diffraction was prepared in the laboratory and analyzed on the same equipment by the same operator to insure consistency. The samples used to produce the curve for alpha form was commercial Monolite Fast Blue GS, a mixture of alpha and beta metal-free phthalocyanine available from the Arnold Hoffman Co., a division of ICI, Ltd. This pigment was entirely converted to alpha form before testing by solvent extraction with dichlorobenzene, washing with acetone and precipitation from sulfuric acid in ice water. The beta form sample which produced the curve shown in FIG. 1 was prepared by suspending commercial Monolite Fast Blue GS in triethylenetetramine at a concentration of 1 part pigment to 5 parts triethylenetetramine by weight for four days at about 23° C. The pigment was then washed with methanol and dried.

The X-form phthalocyanine which produced the curve shown was prepared as follows. Commercial Monolite Fast Blue GS was solvent extracted with dichlorobenzene, then washed with acetone and dried. The pigment was then dissolved in sulfuric acid and precipitated in ice water. The precipitate was washed with methanol and dried. The pigment was then neat milled in a ball mill for 7 days, washed with dimethyl formamide and then with methanol.

As can be seen from FIG. 1, X-form phthalocyanine differs dramatically from alpha and beta forms. The spectra for X-form has peaks at Bragg angles of about 17.3 and 22.3 which do not exist with the alpha and beta polymorphs. Also, X-form shows a peak at about 9.1 which is not present with alpha form, and is of lower intensity than the corresponding peaks for beta-form. Further, beta-form has peaks at about 26.2, 18.0, 14.1 and 7.0 and alpha form has peaks at about 26.7, 13.6 and 6.8 which do not occur with X-form. *In addition, the X-form has peaks at 7.5 and 16.7.*

Figure 2:
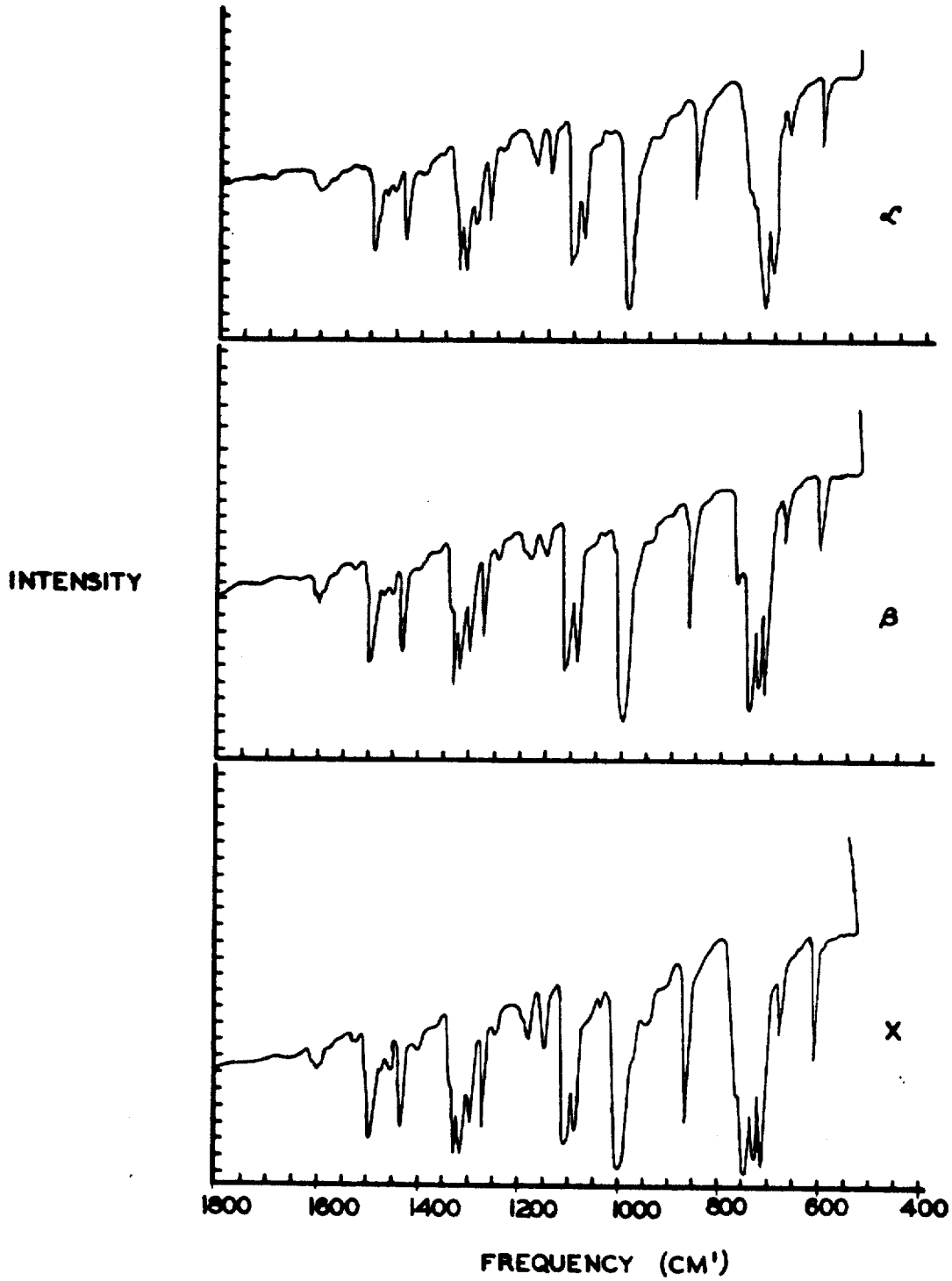
FIG. 2 shows infrared patterns for alpha, beta and X-form polymorph for samples prepared in the laboratory.

FIG. 2 shows infrared spectra for alpha, beta and X-form phthalocyanine samples which were prepared in the laboratory. The spectra were obtained by the same operator on the same equipment to insure consistency.

The samples of alpha, beta and X-form phthalocyanine tested here were prepared by the methods described above in the description of FIG. 1. The spectra for X-form phthalocyanine differs markedly from those for alpha, and beta forms.

[In characterizing the alpha, $\beta$ and 5-forms, the position of four C—H deformation bands may be considered. For the alpha form these exist at 708, 724, 728 and 733 cm.$^{-1}$. In the beta form they are shifted to the higher frequencies of 715, 725, 732 and 745 cm.$^{-1}$. The "X"-form had the same C—H deformation bands as the beta, but in this spectra, differences are shown as a change in the intensity ratio for the 765 and 755 cm.$^{-1}$ bands. For the beta, the intensities are nearly equal, but with the "X"-form, the intensity of the 765 cm.$^{-1}$ is about twice that of the 775 cm.$^{-1}$ band.]

Other band changes, such as those between 1250 and 1350 cm.$^{-1}$ can be used to characterize the three forms. The relative ratios for the four bands are quite different for the three forms, as can be seen in FIG. 2.

The following examples further specifically define the present invention with respect to methods of preparing X-form phthalocyanine. Parts and percentages are by weight unless otherwise indicated. The examples below are intended to illustrate various preferred embodiments of methods of preparing X-form phthalocyanine.

The starting material in each of the following examples is Monolite Fast Blue GS, a mixture of alpha and beta forms of metal-free phthalocyanine available from the Arnold Hoffman Company. However, this starting material for the process of preparing X-form phthalocyanine may be prepared by any conventional method. For example, any of the methods of preparing alpha or beta metal-free phthalocyanine described by F. Moser and A. Thomas in Phthalocyanine Compounds, ACS Monograph 157, Reinhold Publishing Company (1963), may be used if desired. A metal-free phthalocyanine may be converted to the X-form phthalocyanine of this invention, broadly, by neat milling or salt milling alpha phthalocyanine for a sufficient time. In order to determine the time necessary for complete conversion to X-form, for a specific milling process, samples should be taken at regular intervals and examined by either infrared or X-ray analysis. The time necessary for complete conversion by the particular milling process may be thus empirically determined for later production of additional X-form phthalocyanine by the same process. The following examples [described] *describe* particular preferred embodiments of methods of producing X-form metal-free phthalocyanine.

EXAMPLE I

About 100 parts Monolite Fast Blue GS, a mixture of alpha and beta forms of metal-free phthalocyanine available from Arnold Hoffman Company, is purified by extraction with a mixture of equal volumes of O-dichlorobenzene and methanol at about 50° C. for about 24 hours in a Soxhlet extraction unit. The phthalocyanine is then added portion-wise to concentrated sulfuric at a ratio of about 1 part phthalocyanine to about 6 parts sulfuric acid at about 5° C. The mixture is stirred at ice-bath temperature for about 1½ hours, then filtered through a coarse sintered glass funnel. Precipitation is effected by pouring the solution slowly into about 5 times its volume of a well-stirred ice-water mixture. The phthalocyanine precipitates immediately; after allowing the suspension to sit for about 10 minutes, the product is isolated by filtration. The resultant cake is washed to neutrality with distilled water, rinsed several times with acetone, and dried in air for several days. X-ray and infrared analysis show this phthalocyanine to be alpha-form metal-free phthalocyanine.

About a 35 gram portion of this phthalocyanine product is then placed in a quart porcelain jar half-filled with burundum cylinders 13/16 x 13/16 inch. The jar is sealed and rolled at about 70 revolutions per minutes. Aliquot samples are withdrawn from the jar at 6 hour intervals, and processed as required for polymorphic identification by infrared spectroscopy. After about 48 hours of neat milling, analysis shows that the entire sample has been converted to the X-polymorph.

EXAMPLE II

A sample of alpha form metal-free phthalocyanine is prepared as in Example I above. About 37 grams of this phthalocyanine product are then placed in a quart porcelain jar half-filled with burundum cylinders. About 340 grams of sodium chloride is then added to the jar, the jar is sealed and rolled at about 70 revolutions per minute. Aliquot samples are withdrawn from the jar at 6 hour intervals and processed as required for polymorphic identification by infrared spectroscopy. The salt-milled sample is freed from salt by washing with distilled water and methanol prior to infrared analysis. After 66 hours, the phthalocyanine is partiallly converted to X-form. After 144 hours, the sample is found to have completely converted to the X-polymorph.

EXAMPLE III

A sample of alpha form metal-free phthalocyanine is prepared as in Example I above. About 0.5 gram of the phthalocyanine is placed in a Spex Mixer Mill unit for grinding. This is a small grinding apparatus, commonly used by dentists, which consists of a stainless steel cylinder (1 inch long and ½ inch in diameter) and a single stainless ball (¼ inch in diameter) which functions via a high speed oscillating action. This provides a highly efficient milling action. All of the phthalocyanine sample is found to have converted to X-form after two hours of grinding. Since conversion to X-form is more rapid in neat milling than in salt milling, and even more rapid in the Spex Mixer Mill unit, it can be tentatively concluded that for formation of X-form phthalocyanine, highly efficient grinding action is preferable.

EXAMPLE IV

About 50 parts magnesium phthalocyanine is slowly stirred into about 500 parts of 96 percent sulfuric acid, the mixture is stirred and maintained at about −3° C. The solution is filtered through a coarse sintered glass funnel and is washed with more acid. The sulfuric acid solution is then run slowly into ice made from distilled water. The blue precipitate is collected on a filter, washed acid free, and dried. About 30 parts of alpha metal-free phthalocyanine is produced, as shown by infrared and X-ray analysis.

About a 40 gram portion of this product is placed in a quart porcelain jar half-filled with ¾" porcelain balls. The jar is sealed and rolled at about 50 revolutions per minute. Aliquot samples are withdrawn from the jar at 6 hour intervals and subjected to infrared and X-ray analysis. After about 60 hours of neat milling, analysis shows that the entire sample has been converted to the X-polymorph.

Any suitable grinding process may be used to convert alpha, or beta metal-free phthalocyanine to the X-polymorph. Typical grinding processes include ball milling with ceramic or metallic balls, salt milling using ceramic or metallic balls, and a grinding aid such as sodium chloride and milling using Spex Mixer Mills. Where the phthalocyanine is salt milled, any suitable milling aid may be used. Typical milling aids include sodium chloride, sodium bicarbonate, hydrosodium sulfate, and mixtures thereof.

The starting material may be metal-containing or metal-free phthalocyanine prepared by any conventional process. Typical phthalocyanine syntheses are described by Frank H. Moser and Arthur L. Thomas in the above mentioned book. Where the phthalocyanine used is metal-containing, the preliminary purification steps should include the removal of the metal atom. Typical methods of preparing metal-free phthalocyanine from metal phthalocyanine are described in pages 108–118 of the above cited Moser and Thomas book. In general, alpha form may be produced from a mixture of different forms by milling with sodium chloride alone. Beta form may be similarly produced by milling with sodium chloride and xylene or some other aromatic solvent. Thus, if alpha form metal-free phthalocyanine is subjected to grinding, it will convert directly to X-form while the beta and gamma form starting material will convert first to alpha form and then to X-form during milling.

The compositions of this invention are, as discussed above, especially useful as photoconductive materials in electrophotography. The X-polymorph of metal-free phthalocyanine may be used in the preparation of polymeric phthalocyanine as described in copending application Ser. No. 468,983, filed July 1, 1965. These compositions are also useful as pigments in inks, paints, varnishes, molded synthetic resin objects, etc. These compositions may have other materials mixed therewith for particular applications to enhance, synergize or otherwise modify their properties.

For all Bragg angles mentioned in the description of this invention radiation corresponding to the Copper $K_a$ wavelength, 1.54050 A., was used. If desired, values measured in Bragg angles may be converted to absolute spacings (d) by the following equation: $N\lambda=2d \sin \theta$ where "N" is the order of diffraction (here, 2) "λ" is the wavelength of the X-radiation (here, 1.54050 A.), "d" is the spacing which gives rise to the interference phenomenon, and "θ" is the Bragg scattering angle.

Although specific materials and conditions were set forth in the above exemplary processes of making the compositions of this invention, these were merely meant to be illustrative of the invention. Various other starting metal-free phthalocyanines substituted or unsubstituted, and various conditions may be substituted for those in the examples with similar results. Many other modifications of the invention will occur to those skilled in the art upon reading the present disclosure; these are intended to be encompassed within the spirit of this invention.

What is claimed is:

1. [Metay] *Metal*-free phthalocyanine in the "X"-form having an X-ray diffraction pattern exhibiting strong lines at Bragg angles of 7.5, 9.1, 16.7, 17.3 and 22.3.

2. The "X"-form metal-free phthalocyanine of claim 1 which also has a strong infrared absorption band at [746] *752* cm.$^{-1}$, *has an intensity at 770 cm.$^{-1}$ which is about twice the intensity of the 780 cm.$^{-1}$ band,* [has three peaks between about 700 and 750 cm.$^{-1}$] and has bands of about equal intensity at 1318 and 1330 cm.$^{-1}$.

References Cited

The following references, cited by the Examiner, are of record in the patented file of this patent or the original patent.

UNITED STATES PATENTS

| | | | |
|---|---|---|---|
| 2,820,796 | 1/1958 | Ehrich | 260—314.5 |
| 3,051,718 | 8/1962 | Wheeler | 260—314.5 |

OTHER REFERENCES

Silverstein et al.: Spectrometric Identification of Organic Compounds, pp. 49–57 (1963), Wiley & Sons (N.Y.).

Nyburg: X-Ray Analysis of Organic Structures, p. chart, 1, 22–25, 36–43, 84–89, 92–93; 96–99, 115–127, 147–155 (1961), Academic Press (N.Y.).

Ewing, Instrumental Methods of Chemical Analysis, p. 76 (1961), 2nd ed. (McGraw-Hill).

HENRY R. JILES, Primary Examiner

H. I. MOATZ, Assistant Examiner

PO-1050
(5/69)

UNITED STATES PATENT OFFICE
CERTIFICATE OF CORRECTION

Patent No. Reissue 27117 Dated April 20, 1971

Inventor(s) John F. Byrne and Philip F. Kurz

It is certified that error appears in the above-identified patent and that said Letters Patent are hereby corrected as shown below:

Cancel Claim 2 and insert therefor the following:

[2. The "X"-form metal free phthalocyanine of Claim 1 which also has a strong infrared absorption band at 746 $cm.^{-1}$, has three peaks between 700 and 750 $cm.^{-1}$ and has bands of about equal intensity at 1318 and 1330 $cm.^{-1}$.]

Signed and sealed this 24th day of August 1971.

(SEAL)
Attest:

EDWARD M.FLETCHER,JR.
Attesting Officer

WILLIAM E. SCHUYLER, JR.
Commissioner of Patents